(12) United States Patent
Medapalli et al.

(10) Patent No.: US 9,398,474 B2
(45) Date of Patent: Jul. 19, 2016

(54) SYSTEM AND METHOD FOR NETWORK CODED TCP IN LONG TERM EVOLUTION (LTE)

(71) Applicant: Broadcom Corporation, Irvine, CA (US)

(72) Inventors: Kamesh Medapalli, San Jose, CA (US); Shimon Edelhaus, Sharon, MA (US)

(73) Assignee: Broadcom Corporation, Irvine, CA (US)

( * ) Notice: Subject to any disclaimer, the term of this patent is extended or adjusted under 35 U.S.C. 154(b) by 259 days.

(21) Appl. No.: 14/087,964

(22) Filed: Nov. 22, 2013

(65) Prior Publication Data

US 2014/0146707 A1    May 29, 2014

Related U.S. Application Data

(60) Provisional application No. 61/729,499, filed on Nov. 23, 2012.

(51) Int. Cl.
*H04W 24/02* (2009.01)
*H04L 1/00* (2006.01)
*H04L 1/18* (2006.01)

(52) U.S. Cl.
CPC ............ *H04W 24/02* (2013.01); *H04L 1/0003* (2013.01); *H04L 1/1812* (2013.01); *H04L 1/1825* (2013.01)

(58) Field of Classification Search
CPC ................................................... H04W 24/02
See application file for complete search history.

(56) References Cited

U.S. PATENT DOCUMENTS

| 9,143,274 B2 * | 9/2015 | Zeger | ........................ H04L 5/16 |
| 2007/0116024 A1 * | 5/2007 | Zhang | ................. H04L 12/5693 370/412 |
| 2010/0046371 A1 * | 2/2010 | Sundararajan | .......... H04L 1/004 370/235 |
| 2014/0112352 A1 * | 4/2014 | Li | ........................... H04L 69/16 370/474 |

FOREIGN PATENT DOCUMENTS

WO    WO 03/027884 A1    4/2003

OTHER PUBLICATIONS

Kim, M., et al., "Modeling Netword Coded TCP Throughput: A Simple Model and its Validation," *arXiv: 1008.0420v1 [cs.IT]*, downloaded from Internet at http://arxiv.org/pdf/1008.0420.pdf, 9 pages (2010).
Kumar Sundararajan, J., et al., "Network Coding Meets TCP," *IEEE INFOCOM 2009 proceedings*, pp. 280-288 (2009).

(Continued)

*Primary Examiner* — Charles C Jiang
*Assistant Examiner* — Thad Defauw
(74) *Attorney, Agent, or Firm* — Sterne, Kessler, Goldstein & Fox PLLC

(57) ABSTRACT

Apparatuses and methods are provided for determining operating modes of a communications link for a user equipment (UE) in a communications system based on whether the UE is configured for network coded transmission control protocol (TCP-NC). The operating modes can include physical layer channel error recovery, modulation, channel selection, among others. For example, physical layer channel error recovery can be scaled-back, or disabled, when TCP-NC is available because it is a redundant error recovery scheme. Accordingly, power can be saved, higher spectral efficiency can be achieved, and the user experience can be improved while the TCP-NC protocol recovers any data loss due to channel, errors.

20 Claims, 5 Drawing Sheets

(56) References Cited

OTHER PUBLICATIONS

Kumar Sundararajan, J., et al., "Network Coding Meets TCP: Theory and Implementation," *Proceedings of the IEEE*, vol. 99, No. 3, pp. 490-512 (2011).

Mitzenmacher, M., et al., "Network Coding Meets TCP." Slides of a talk presented in London, downloaded from internet at www.eecs.harvard.edu/~michaelm/TALKS/London.ppt, 35 pages, (2009).

Singh Rawat, A., et al., "Application of Network Coding in TCP," *Department of Electrical Engineering, Indian Institute of Technology*, India, EE673 presentation, 22 pages (2009).

European Search Report directed to related European Patent Application No. 13 00 5492.7, Munich, Germany, mailed Apr. 4, 2014; 3 pages.

Teerapittayanon, et al., "Network Coding as a WiMAX Link Reliability Mechanism," Multiple Access Communications, Nov. 19, 2012, Heidelberg; pp. 1-12.

\* cited by examiner

SYSTEM AND METHOD FOR NETWORK CODED TCP IN LONG TERM EVOLUTION (LTE)

CROSS REFERENCE TO RELATED APPLICATIONS

The present application claims priority to U.S. Provisional Patent Application No. 61/729,499, filed on Nov. 23, 2012, which is hereby expressly incorporated by reference in its entirety.

BACKGROUND

1. Field

The present disclosure relates generally to methods and systems for determining operating modes of a communications link for a user equipment (UE) in a communications system based on whether the UE is configured for Network Coded Transmission Control Protocol (TCP-NC.)

2. Background Art

Long Term Evolution (LTE) is a wireless communications standard that supports high-speed data for a user equipment (UE). LTE is based on Global System for Mobile communication (GSM)/GSM Evolution (EDGE) and Universal Mobile Telecommunications System (UMTS)/High Speed Packet Access (HSPA) network technologies. In LTE, wireless link protocols are designed to provide a near error-free channel at transport layer. Channel errors due to fading, mobility, etc. are recovered using error recovery schemes (such as Automatic Repeat reQuest (ARQ), Hybrid ARQ (HARQ), Power Control, Link Adaptation, etc.) to make the residual error rate at TCP level very small (e.g., less than $10^{-6}$.) These error recovery schemes, and other operating modes of the UE, consume power at the UE and affect channel capacity.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

Figure 1A:
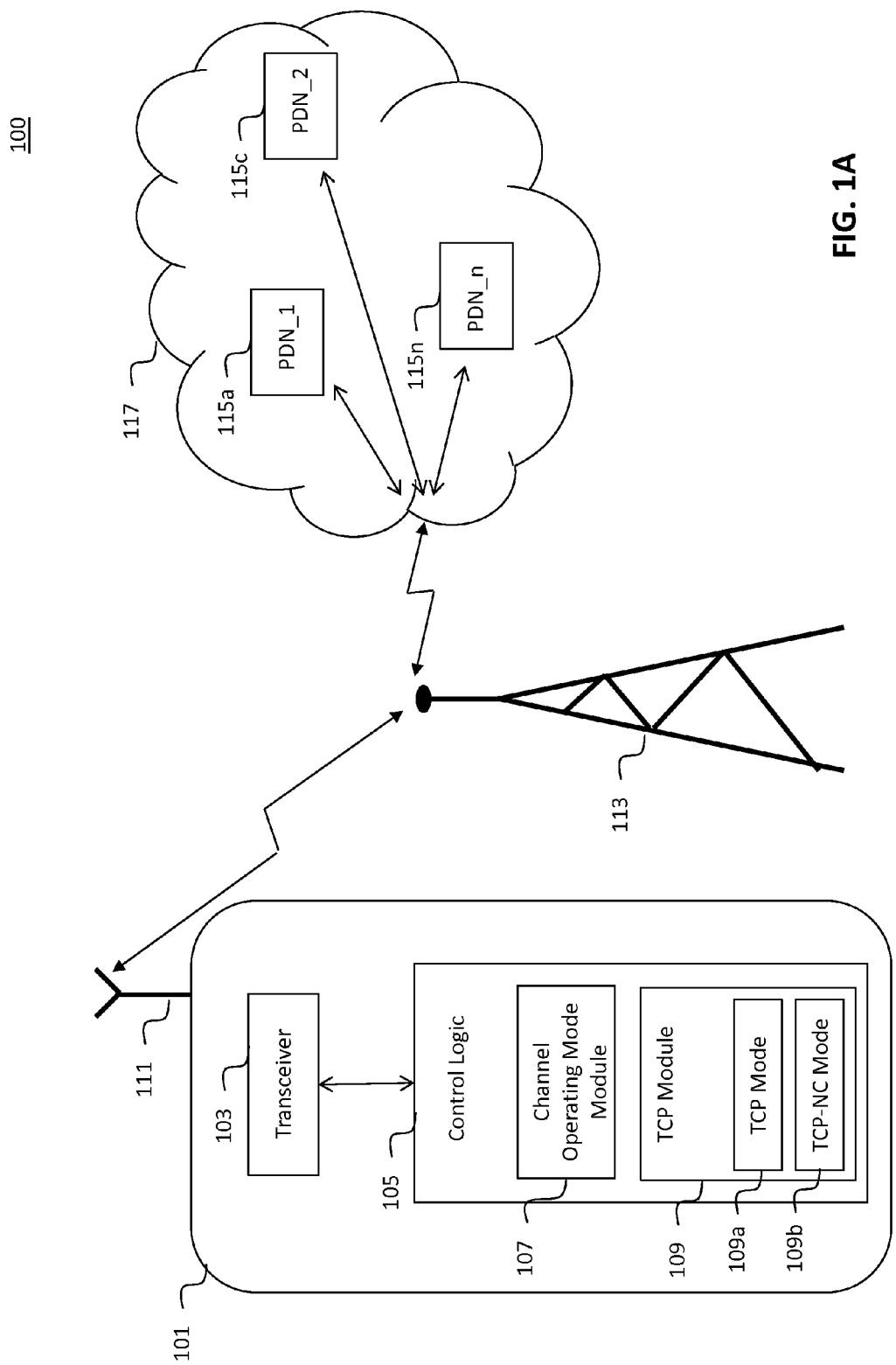
FIGS. 1A and 1B illustrate a system, in accordance with an embodiment of the present disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Apparatuses and methods are provided for communicating with a user equipment (UE) in a communications system. According to a first embodiment of the disclosure, a method is provided that includes determining whether the UE is configured for network coded transmission control protocol (TCP-NC) and selecting one or more operating modes of a communications link in the UE, based on whether the UE is configured for TCP-NC.

According to another embodiment of the disclosure, a user equipment (UE) is provided that includes a radio transceiver and a control logic. The radio transceiver is configured to transmit wireless signals to a base-station. The control logic is configured to determine whether the UE can operate according to a network coded transmission control protocol (TCP-NC) so as to determine the TCP-NC status of the UE, the control logic further configured to send an information message to the base-station that reports the TCP-NC status of the UE to the base-station.

According to another embodiment of the disclosure, a base-station equipment is provided that includes a radio transceiver and a control logic. The radio transceiver is configured to communicate wireless signals to a user equipment (UE). The control logic is configured to determine whether the UE is compatible with a network coded transmission control protocol (TCP-NC) so as to determine the TCP-NC status of the UE, and determine a TCP-NC status for each of a plurality of public data networks (PDNs) that are associated with the UE. The control logic is further configured to select one or more channel operating modes for each PDN based on the corresponding TCP-NC status of the PDN and the TCP-NC status of the UE.

Detailed Discussion

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" and the like, shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless mariner.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B," "evolved Node B (eNode B)," home Node B (HNB), "home access point (HAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations.

FIG. 1A illustrates a system 100, according to an embodiment of the present disclosure. For example, system 100 illustrates user equipment (UE) 101 that communicates with wireless network device 113 such as a Node B, a base station, an access point, or the like. According to one example, system 100 is configured to affect channel error recovery by scaling-back, or disabling, one or more channel error recovery schemes in UE 101, based on whether UE 101 is configured for TCP-NC or not. In one example, UE 101 can be, but is not limited to, a mobile phone, smartphone, personal digital assistant (PDA), etc. UE 101 can include, but is not limited to, a transceiver 103 including a radio transmitter and receiver, an antenna 111, and control logic 105. Control logic 105 includes a channel operating mode module 107 and a TCP module 109 that includes TCP mode 109*a* and TCP-NC mode 109*b*, all or some of which can be executed utilizing one or more processors. For example, the control logic 105 can be implemented using one or more processor(s) and/or state machine logic, or a combination thereof, programmed or implemented to have the functionality described herein. As discussed below, TCP module 109 can operate or cause the UE to operate in a TPC mode 109*a* and a TPC-NC mode 109*b*.

According to one example, UE 101 can communicate with communication network 117 through wireless network device 113. In one example, communication network 117 can include, but is not limited to, personal area networks, local area network, mesh network, metropolitan area network, wide area network, mobile network (such as global system for mobile communications, personal communications service, digital advance mobile phone service, etc.), Internet, or the like. For example, communication network 117 can include one or more public data networks (PDN) 115*a*-115*n* (e.g., IP networks). According, to this example, UE 101 can communicate with one or more PDNs 115*a*-115*n*, through wireless network device 113, using TCP or TCP-NC as described herein. If UE 101 is TCP-NC capable but none of the PDNs associated with UE 101 are TCP-NC capable, the communication between UE 101 and the PDNs are performed based on (normal) TCP. However, if both UE 101 and (for example) PDN 115*a* are capable of TCP-NC, the communication between UE 101 and the PDNs are performed based on TCP-NC. Further, system 100 is configured to modify channel error recovery by, for example, by scaling back or disabling one or more physical layer channel error recovery schemes in UE 101, when both the UE 101 and a corresponding PDN are TCP-NC compatible.

According to one example, UE 101 is configured to use transceiver 103 and antenna 111 for communication with network device 113. For example, UE 101 transmits control packets, signaling messages, and/or data packets to network device 113 and receives acknowledgments, signaling messages, and/or data packets from device 113 through transceiver 103 and antenna 111.

According to one embodiment, UE 101 operates according to a Long Term Evolution (LTE) communications standard. LTE is a wireless communications standard that supports high-speed data for a user equipment (UE). The standard is developed by the 3GPP (3rd Generation Partnership Project) and is specified in its Release 8 document series, with enhancements described in Release 9, both of which are incorporated herein in their entireties. The present disclosure has been described in terms of LTE wireless communications network. However, the disclosure is not so limited, as will be understood by those skilled in the arts. The present disclosure can apply to any communications network (wireless or otherwise) having a protocol that utilizes channel error recovery schemes and can support TCP-NC, for example wireless local area network (WLAN).

According to one embodiment, control logic 105 include a channel operating mode module 107, which support control logic 105. Channel operating mode module 107 is configured to perform one or more channel error recovery schemes to recover errors that can occur during data transmission due to fading, interference, mobility, etc. These schemes can include Automatic Repeat reQuest (ARQ), Hybrid ARQ (HARQ), Power Control, Link Adaptation, etc. According to one example, channel operating mode module 107 is configured to perform ARQ, a channel error recovery scheme that uses acknowledgements and timeouts to achieve a reliable transmission over a channel. In this scheme, if a transmitter, such as transceiver 103 of UE 101, does not receive an acknowledgement of a packet it has sent before a timeout, the transmitter re-transmits the packet until it receives the acknowledgment, unless a predefined number of re-transmissions are reached.

Additionally or alternatively, channel operating mode module 107 is configured to perform HARQ, which is a combination of high-rate forward error-correcting coding and ARQ. In one example, in standard ARQ, redundant bits are added to data to be transmitted using an error-detecting (ED) code such as a cyclic redundancy check (CRC). When receivers detect a corrupted message using the ED code, the receiver will request a new message from the transmitter. In one example, in HARQ, the original data is encoded with a forward error correction (FEC) code, and the parity bits are either immediately sent along with the message or only transmitted upon request when a receiver detects an erroneous message. The FEC code is chosen to correct an expected subset of all errors that may occur, while the ARQ method is used as a fall-back to correct errors that are uncorrectable using only the redundancy sent in the initial transmission.

Channel operating mode module 107 can also be configured to perform Link adaption or adaptive modulation and coding (AMC), which is the process of matching the modulation, coding and other signal and protocol parameters to the conditions of channel. The conditions of channel can include path loss, interference, available power, etc. For example, in one communications system (such as EDGE), a rate adaptation algorithm is used that adapts the modulation and coding scheme according to the quality of the radio channel. As another example, in HSDPA, link adaptation is performed by selecting the modulation type and/or choice of FEC code rate. For example, regarding modulation, the link can employ QPSK for noisy channels and 16QAM or higher for clearer channels. Further, the FEC code rate may be a nominal rate of ⅓, but it can be varied effectively by bit puncturing and HARQ with incremental redundancy.

In one example, where link adaptation is done using modulation type (for example, HSDPA), QPSK can be used for noisy channels, which would result in more robust system that can tolerate higher level of interference, but would have lower transmission rate. When 16QAM modulation is used for less noisy channels, higher bit rates can be reached. However, the transmitted data will be more prone to errors caused by channel interference and noise, and therefore may require stronger FEC coding, which could result in lower information bit rate.

Channel operating mode module 107 can also be configured to perform power control. In a communications system, transmit powers of transmitters can be controlled by, for example, network device 113 (and/or a network operator operating the network device 113) to adjust data rate, network capacity, coverage, etc. In one example, power control can affect signal-to-noise ratio in the channel, which can have an effect on bit error rate. Power control can be used as one channel error recovery scheme in system 100.

Additionally or alternatively, channel operating mode module 107 is configured to perform Channel Coding or Forward Error Correction, which is a method used for detecting and correcting errors in data transmission over communication channels. The transmitter, such as transceiver 103 of UE 101, can encode its message/packets in a redundant manner using, an, error-correction code (ECC) before transmitting, them on the communication channel. The redundancy allows the receiver to detect a number of errors that may have been introduced during the transmission of the messages/packets and correct these errors without requesting for re-transmission of the messages/packets. Channel coding reduces or eliminates the need for a reverse channel for requests for re-transmissions, but at a cost of higher forward channel bandwidth or lower actual data rate.

Additionally or alternatively, channel operating mode module 107 is configured to determine whether UE 101 uses single or multiple antennas depending on, for example, UE's capabilities, the network device's and/or network's capabilities, etc. When a multiple-input multiple-output (MIMO) system is used and the UE is MIMO compatible, module 107 can be configured to determine MIMO parameters to support spatial multiplexing and the like. For example, channel operating mode module 107 can be configured to determine whether to use closed-loop MIMO or open loop MIMO. In closed loop, UE 101 sends back channel information and/or characteristics to the network and the network can apply correct phase and amplitude adjustments to antenna beams or nulls that are directed at UE 101. Module 107 can also be configured to affect the number of spatial streams that are used for communication between UE 101 and network device 113. Module 107 can also be configured to affect the precoding (a multi-stream beam forming) and/or diversity coding (techniques used when no channel knowledge exists at a transmitter) in MIMO.

Additionally or alternatively, module 107 is configured to affect the number of radio frequency (RF) carriers that are used to transport data. For example, LTE can allow up to 3 component carriers to be aggregated on the Downlink, and 2 carriers on the Uplink. Network device 113 and/or module 107 can determine the number of carriers to affect the throughput of the channel. More carriers generally provide more data throughput.

According to one example, system 100 is configured to configure one or more of operating modes of a link when a determination is made that UE 101 is configured for network coded transmission control protocol (TCP-NC). This can include scaling-back, or disabling, one or more channel error recovery schemes when the determination is made that UE 101 is TCP-NC capable.

The Internet Protocol Suite, TCP/IP, is a suite of protocols used for communication over the Internet. TCP/IP is described in 4 layers: Application, Transport, Internet, and Network. TCP corresponds to the transport layer and provides a communication service at a level between an application program and the Internet Protocol layer (IP layer). Therefore, when an application program desires to send data across a network, the application program can issue a single request to the TCP and then the TCP can handle IP details.

IP works by exchanging pieces of information called packets. A packet is a sequence of octets (bytes) and consists of a header followed by a body. The header describes the packet's source, destination and control information. The body contains the data IP is transmitting. Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. Once a TCP receiver has reassembled the sequence of octets originally transmitted, it passes them to the receiving application.

Thus, TCP abstracts the application's communication from the underlying networking details For example, TCP accepts data from a data stream, divides it into chunks, and adds a TCP header creating a TCP segment (also called packet). The TCP packet is then encapsulated into an Internet Protocol (IP) datagram (also called packet), and then the IP packet is exchanged with peers. The TCP header describes the packet's source, destination and control information, and the remaining payload contains the data.

Flow control (that limits the rate a sender transfers data to guarantee reliable delivery) and congestion control in TCP works based on the idea of a sliding transmission window of packets, whose size is controlled based on feedback. The term "window" on transmitter side represents the logical boundary of the total number of packets yet to be acknowledged by the receiver. A transmitter that does not hear an, acknowledgment cannot know if the receiver actually received the packet. Also, it might be possible that the acknowledgment was lost or damaged in transmission. If the receiver detects an error because of corruption, the receiver will ignore the packet and will not send an acknowledgement. Similarly, there is a possibility that an acknowledgment has been sent, but was lost or corrupted during transmission. The transmitter and receiver each have a current sequence number. They each also have a window size. The window sizes may be varied based on the receiver packet acknowledgements.

TCP was mainly designed for communication over wired networks. In wired networks, packets losses are generally indication of congestion. However, this is not the case for wireless networks, such as LTE, where TCP can be used as a protocol for data transmission. Packet losses in wireless networks can be due to mobility, fading, interference, etc. Therefore, in wireless networks, TCP can often incorrectly assume that congestion occurred and unnecessarily require a reduction packet transmission rates. Therefore, TCP's performance in wireless networks can be poor compared to wired networks due to mobility, fading, or interference. (See "Modeling Network Coded TCP Throughput: A Simple Model and its Validation," Minh Kim, Muriel Medard, Joao Barros, arXiv:1008.0420 [cs.IT], which is incorporated herein in its entirety.) In other words, TCP performs poorly on lossy networks as it interprets packet losses as congestion. (See "Network Coding Meets TCP," Jay Kumar Sundararajan, Devavrat Shah, Muriel Medard, Michael Mitzenmacher, Joao Barros, Proceedings of IEEE INFOCOM 2009, which is incorporated herein in its entirety.)

Network coding is a technique that can be used to increase throughput and efficiency of a network. In network coding, each node of a network can transmit a combination (such as a linear combination) of multiple packets instead of simply transmitting one packet. Recently, research has been performed on combining TCP with network coding. (See "Modeling Network Coded TCP Throughput: A Simple Model and its Validation" and "Network Coding Meets TCP," mentioned above.) TCP-NC adds network coding to TCP to improve the throughput of TCP in lossy channels. More specifically, the coding is combined with congestion control of TCP to improve TCP's performance.

As discussed above, the TCP layer in a layered architecture is a layer between the application layer and the Network layer (e.g., IP layer.) The TCP layer provides flow control and congestion control. In TCP-NC protocol, an additional layer of Network Coding is added between the TCP and IP layers. For each TCP packet to be sent from a sender's buffer, the Network Coding layer linearly combines a random number of packets. For example, if packets P1, P2, and P3 are stored in the sender's buffer, for a first TCP packet to be sent, the sender transmits P1+P2+P3. For the second TCP packet, the sender transmits P1+2P2+P3 and for the third TCP packet, the sender transmits P1+2P2+2P3. (See "Modeling Network Coded TCP Throughput: A Simple Model and its Validation" and "Network Coding Meets TCP," mentioned above.)

At the receiver side, unlike regular TCP, the receiver cannot acknowledge each individual packet P1, P2, P3 until the received packets are decoded, specifically when decoding would require a number of packets being received. For this reason, the acknowledgment in TCP-NC is different than regular TCP. In TCP-NC, instead of individual packets, the receiver acknowledges a degree of freedom, defined as a linear combination that can reveal a packet. Accordingly, a receiver acknowledges a packet when the receiver sees it, even before the packet is decoded. A packet is said to be seen once enough useful packets have arrived that would allow the receiver to decode the packet. The receiver buffers the incoming linear combinations until the receiver can decode them and then they are passed to the TCP layer of the receiver. (See "Modeling Network Coded TCP Throughput: A Simple Model and its Validation" and "Network Coding Meets TCP," mentioned above.)

As discussed above, the Network Coding layer of the transmitter is configured to linearly combine a random number of packets. This random number, also defined as redundancy factor, enables TCP-NC to recover from random losses but not from related losses are that results of congestion. Therefore, TCP-NC has significant throughput improvement over TCP as it can recover packet losses in wireless networks that can be due to fading, interference, and other physical phenomena. Additionally, with regard to flow control and congestion control, TCP-NC is designed such that its window size can be increased faster in comparison to TCP. Further, TCP-NC can maintain its large window size in view of random losses. However, TCP reduces its window size significantly in view of random losses as TCP treats these losses as congestion. (See "Modeling Network Coded TCP Throughput: A Simple. Model and its Validation" and "Network Coding Meets TCP," mentioned above.)

According to this example, UE 101 can determine whether it is configured for TCP-NC. When UE 101 is communicating with network device 113 using physical layer channel error recovery schemes provided by module 107 and using TCP, the error rate for the channel is very low due to the physical layer channel error recovery schemes. However, the physical layer channel error recovery schemes consume power and can affect channel capacity. When the error rate is so low, TCP-NC does not offer much benefit over TCP. However, by scaling back or disabling one or more channel error recovery schemes and enabling TCP-NC mode 109a of TCP module 109, the UE 101 can take advantage of TCP-NC protocol so as to keep the error rate low, but also increase spectral efficiency, lower power consumption, and improve overall data throughput.

The channel error recovery schemes can be considered as physical layer schemes, where the physical layer is the lowest layer according to the TCP/IP protocol layer arrangement. Whereas, TCP and TCP-NC operate on the network layer, which is a higher layer in the TCP/IP protocol layer arrangement. Accordingly, both channel recovery and TCP-NC can be used to recover corrupted or lost data that occurs during wireless transmission. The disclosure herein recognizes that if TCP-NC is available on the UE and the corresponding public data network (PDN) being used by the UE, then the UE can scale-back, or even eliminate, the channel error recovery schemes because they are somewhat redundant in light of TCP-NC. This can result in higher spectral efficiency, and/or lower power consumption for the UE, and even the base-station in communication with the UE.

According to one example, when UE 101 determines its capability for TCP-NC, UE 101 uses radio resource control (RRC) signaling (or other signaling) to inform network device 113. In one example, the signaling is specific to each PDN that is available to the UE. For example in a LTE communications system, the UE 101 can be connected to 8 different PDNs (e.g., IP networks) for example PDNs 115a-115n. According to this example, UE 101 can determine, its capability for TCP-NC and one or more PDNs available for connection that also can use TCP-NC. (i.e. both the source and destination nodes will need to be TCP-NC capable to communicate properly). UE 101 can inform the PDNs capable of TCP-NC that it is configured to use this protocol, and also inform the network device 113 which of the available PDNs are TCP-NC capable. Based on this information, network device 113 and/or network operator associated with network device 113 can modify channel error recovery for UE 101 and corresponding PDNs and further send informational messages regarding the same.

According to one embodiment, network device 113 and/or network operator associated with network device 113 can decide to scale back, or even disable, one or more channel error recovery schemes performed by module 107 and can send information regarding the disabled scheme(s) to UE 101. According to one example, channel recovery scheme ARQ can be disabled. Additionally or alternatively, channel recovery scheme HARQ can be disabled or fewer re-tries can be used. As a result, these channel error recovery schemes that are usually performed at the physical layer, are replaced with TCP-NC at the transport layer of an IEEE layer protocol that characterizes the communications system.

Additionally or alternatively, network device 113 and/or network operator associated with network device 113 can select a communications channel for use by UE 101 from a plurality of communications channels that have different loss characteristics, where selection is at least partially based on the TCP-NC status of the UE and its corresponding PDNs. According to this example, a plurality of communications channels are available for connection between the UE 101 and the network device 113, and these channels have different loss characteristics. Further, different channels may be available for different PDNs used by the UE. In this example, when TCP-NC is available, the network device 113 can select a channel that has a loss characteristic that is higher than it normally would without TCP-NC, because TCP-NC will perform data recovery. In other words, the selected channel can have a higher loss characteristic than at least one other channel of the plurality of channels. Network device 113 and/or network operator associated with network device 113 can send the selected channel identification to UE 101.

Additionally or alternatively, network device 113 and/or network operator associated with network device 113 can select a signal modulation to be used by UE 101 from a plurality signal modulations based on whether the UE 101 and the corresponding PDNs support TCP-NC. According to this example, a plurality of signal modulations are available for assignment to the UE, each of varying constellation densities (e.g. 16QAM vs. 64 QAM). In this example, when TCP-NC is available, the network device 113 can select a signal modulation that has a higher constellation density than it normally would without TCP-NC, because TCP-NC will perform data recovery. In other words, the selected modulation can have a constellation density that is higher than that of at least one other signal modulation of the plurality of signal modulations. Network device 113 and/or network operator associated with network device 113 can send the selected signal modulation to UE 101.

Accordingly, multiple different modes associated with the UE 101 communications experience can be modified or adjusted based on the availability of TCP-NC. These include the selection of: physical layer channel error recovery, modulation scheme/constellation density, channel selection, MIMO configuration, and LTE downlink channel selection, among others. Those, skilled in the arts will recognize that other operating modes of a communications link can be selected or modified based on TCP-NC status. Those other modes are within the scope and spirit of the present disclosure.

Figure 1B:
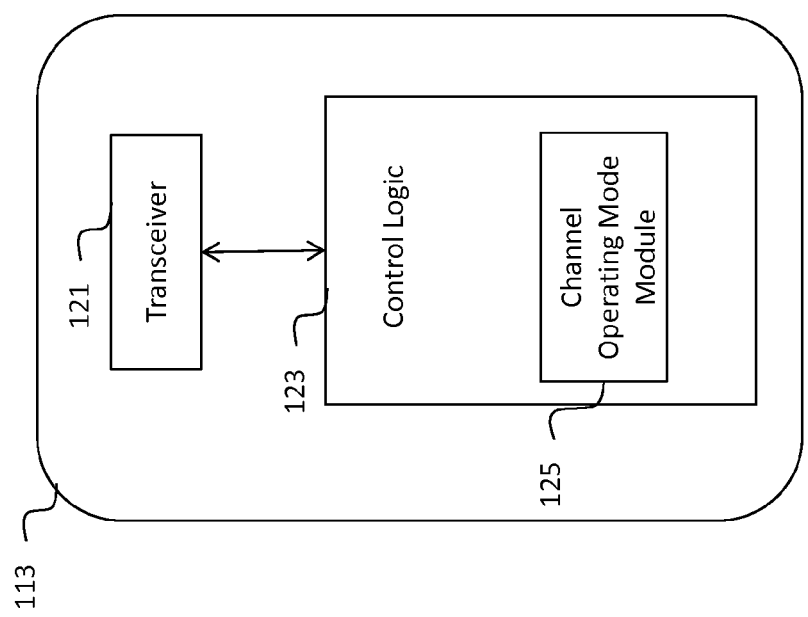

FIG. 1B illustrates wireless network device 113, such as a base-station, according to an embodiment of the present disclosure. Base-station 113 can include a radio transceiver 121 configured to communicate wireless signals to UE 101. Base-station 113 can also include a control logic 123, in addition to other modules, all or some of which can be executed utilizing one or more processors. For example, the control logic 123 can be implemented using one or more processor(s) and/or state machine logic, or a combination thereof, programmed or implemented to have the functionality described herein. The control logic 123 can include a channel operating mode module 125 for determining channel operating modes based on TCP-NC status discussed herein.

According to one example, control logic 123 can determine whether UE 101 is compatible with TCP-NC so as to determine the TCP-NC status of UE 101. In one example, this determination is based on (RRC) signaling (or other signaling) from UE 101. In other words, the UE can send an information message identifying its TCP-NC status. Additionally or alternatively, control logic 123 can determine the TCP-NC status of UE 101 based on data and/or signals sent from and/or to UE 101. In another example, control logic 123 can determine the TCP-NC status of UE 101 based on the PDNs with which UE 101 communicates, and an a priori knowledge of those PDNs and their TCP-NC status, where the a priori knowledge may be stored in a memory (not shown).

According to one example, control logic 123 can determine a TCP-NC status for each of a plurality of PDNs that are associated with UE 101. In one example, this determination is based on information that UE 101 sends to base-station 113 that explicitly identifies the TCP-NC status of each PDN. Additionally or alternatively, control logic 123 can determine the TCP-NC status of each of a plurality of PDNs 115a-115n based on information that is received from each of a plurality of PDNs 115a-115n. When UE 101 is compatible with TCP-NC, control logic 123 can decide to scale back, or even disable, one or more operating modes performed by UE 101 and/or base-station 113 for PDNs that are also compatible with TCP-NC.

According to one example, base-station 113, using control logic 123 and transceiver 123, can send a message to UE 101 indicating that one or more channel error recovery schemes are scaled-back or disabled for PDN that are TCP-NC compatible. Additionally or alternatively, control logic 123 can select a signal modulation from a plurality of signal modulations for each channel used by a corresponding PDN, where the signal modulation selection is based on the TCP-NC status of each PDN and UE 101. Also, control logic 123 can further select a communications channel from a plurality of communications channels for each PDN of the plurality of PDN 115a-115n, each of the communications channels having a different loss characteristic, and where the selection is based on the TCP-NC status of each PDN and UE 101.

Figure 2:
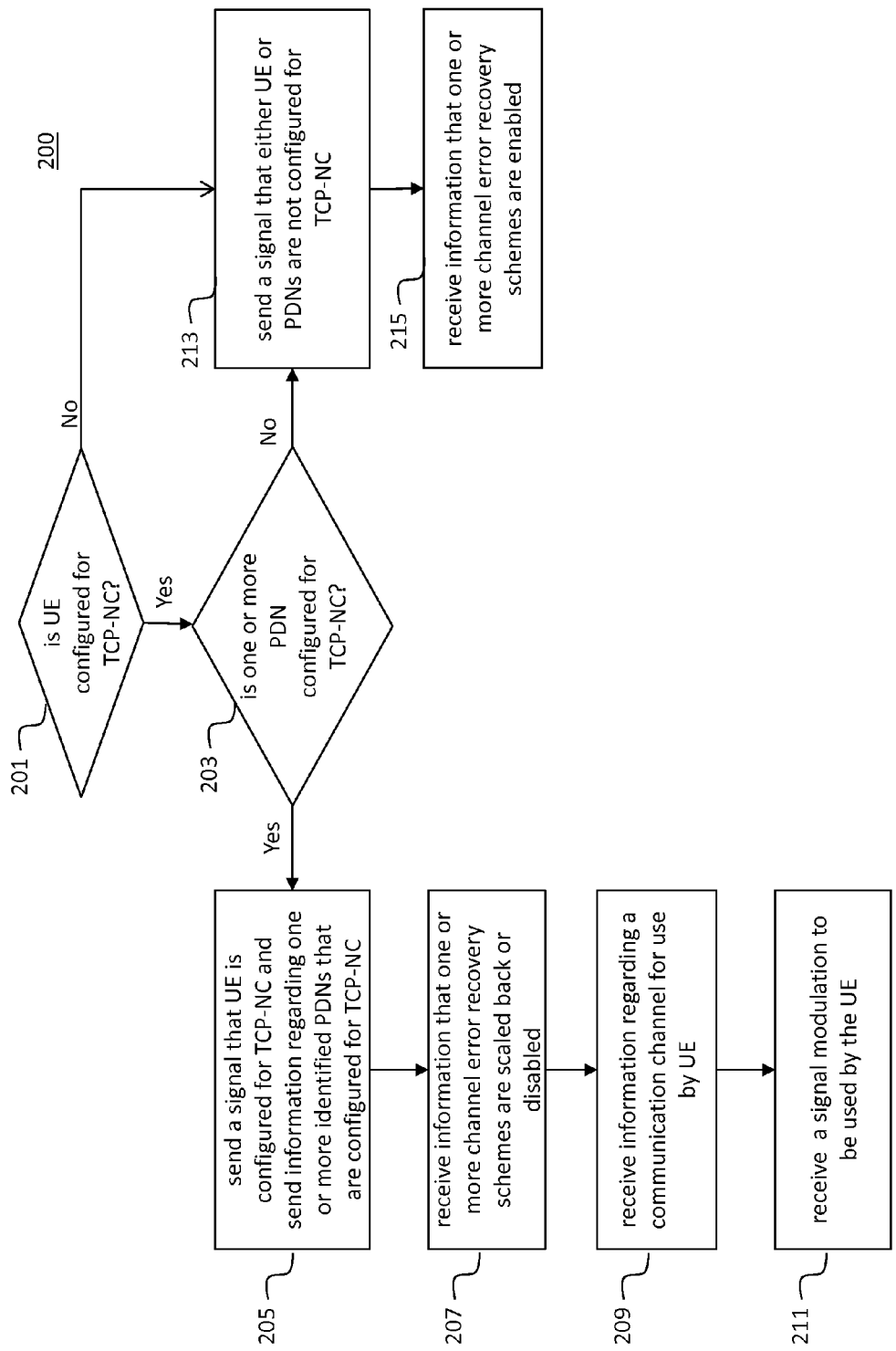
FIG. 2 is a flowchart illustrating a method, in accordance with an embodiment of the present disclosure.

FIG. 2 is a flowchart depicting a method 200, according to an embodiment of the present disclosure. For example, method 200 can be performed by UE 101 (e.g., transceiver 103 and control logic 105 including channel operating mode module 107). It is to be appreciated not all steps may be needed to perform disclosure provided herein. Further, some of the steps may be performed simultaneously, or in a different order than that shown in FIG. 2, as will be understood by those skilled in the art. Reference is made to UE 101 in FIG. 1A merely for convenience of discussion. Other systems may be used to perform the method as will be understood by those skilled in the arts.

In step 201, a determination is made whether the UE is configured for TCP-NC. For example, the determination can be made by control logic 105 of UE 101 of FIG. 1A. According to one embodiment, the determination can be made based on one or more networks that UE 101 is connected to. In one example, information regarding the TCP-NC configuration of UE 101 can be known or programmed a priori and stored in a memory (not shown), where control logic 105 can access to make the determination. However, the disclosure is not so limited, as will be understood by those skilled in the arts. The present disclosure can apply to other methods to determine whether UE 101 can support TCP-NC, the other methods being apparent to those skilled in the art based on the discussion given herein.

If UE 101 does not support TCP-NC, the method is moved to step 213, where UE 101 can send a signal to, for example, network device 113 to inform the network that UE 101 is not configured for TCP-NC. In step 215, UE 101 can receive information from the network (e.g., network device 113) that the channel error recovery schemes are enabled, and further receive the implementation details of the channel error recovery scheme. These channel error recovery schemes can be physical layer channel recovery schemes as discussed above.

If UE 101 supports TCP-NC, the method is moved to step 203, where UE 101 can determine whether one or more of the PDNs with which UE 101 communicates (or desires to initiate a communication) supports TCP-NC. According to one example, this determination can be based on information associated with each PDN that is communicated to UE 101, and/or stored in a memory available to the control logic 105 of the UE 101. Additionally or alternatively, this determination can be based on monitoring headers of the packets transmitted from the PDN to UE 101. However, disclosure is not so limited, as will be understood by those skilled in the arts.

If none of the PDNs support TCP-NC, the method is moved to step 213, where UE 101 can send a signal to the network device 113 to inform the network that none of the PDNs with which UE 101 communicates is configured for TCP-NC. This can be in addition to the indication that the UE, itself, does not support TCP-NC. Accordingly the channel error recovery scheme are, or remain, enabled.

If the UE 101 identifies one or more TCP-NC capable PDNs, then in step 205, the UE 101 can send a signal to, for example, network device 113 to inform the network that UE 101 is configured for TCP-NC and also can send information to identify the one or more PDNs from the plurality of PDNs available to the UE, that are TCP-NC capable. For example, the control logic 105 can generate an information message with the respective TCP-NC status and send to the network device using the transceiver 103. Although this exemplary embodiment is discussed with respect to PDNs, the disclosure is not so limited, as will be understood by those skilled in the arts. The present disclosure can apply to any communications network and/or user equipment. For example, instead of a communication between UE 101 and a PDN, UE 101 can communicate with another UE using TCP, or TCP-NC.

In step 207, UE 101 can receive information from the network that one or more channel error recovery schemes, which can be performed by module 107, are scaled-back or disabled. For example, channel recovery scheme AKQ can be disabled or the number of re-tries can be reduced. Additionally or alternatively, channel recovery scheme HARQ can be disabled or fewer re-tries can be used. Channel operating mode module 107 can then implement the enable/disable of the identified channel recovery schemes. Alternatively, the UE 101, on its own, can implement the enable/disable of the channel recovery schemes based on its determination of TCP-NC status, assuming some autonomy or pre-agreement with the supervising network entity.

Additionally or alternatively, in step 209, UE 101 can receive information from the network device 113, that a communications channel from a plurality of communications channels having different loss characteristics is assigned for use by UE 101, where the selection is at least partially based on the TCP-NC status of the UE and its corresponding PDNs. According to one example, the selected channel has a loss characteristic that is higher than that of at least one other channel of the plurality of channels. The channel assignment can be PDN specific, as some PDNs may be TPC-NC enabled and some may not, so that the TPC-NC PDNs are assigned to a more lossy channel. In this example, by using TCP-NC protocol, UE 101 can compensate for the higher loss characteristic of the channel. Channel operating mode module 107 can then configure transceiver 103 based on the channel selection (e.g. tune transmit and receive frequencies).

Additionally or alternatively, in step 211, UE 101 can receive information from the network device 113, regarding a selected signal modulation to be used by UE 101. In this example, the signal modulation has been selected among a plurality signal modulations based on the determination that UE 101 supports TCP-NC. In one example, the selected signal modulation has a higher constellation density than at least one other signal modulation of the plurality of signal modulations. In this example, UE 101 can compensate for any higher bit error rate due to the denser data constellation using TCP-NC. Again, the signal modulation can be PDN specific, given that some may be TPC-NC enabled, and some may not According to another example, UE 101 can receive information from, for example, the network device 113, regarding a selected high spectral density to be used by UE 101, Channel operating mode module 107 can then configure the UE baseband receiver operations based on the selected signal modulation.

Figure 3:
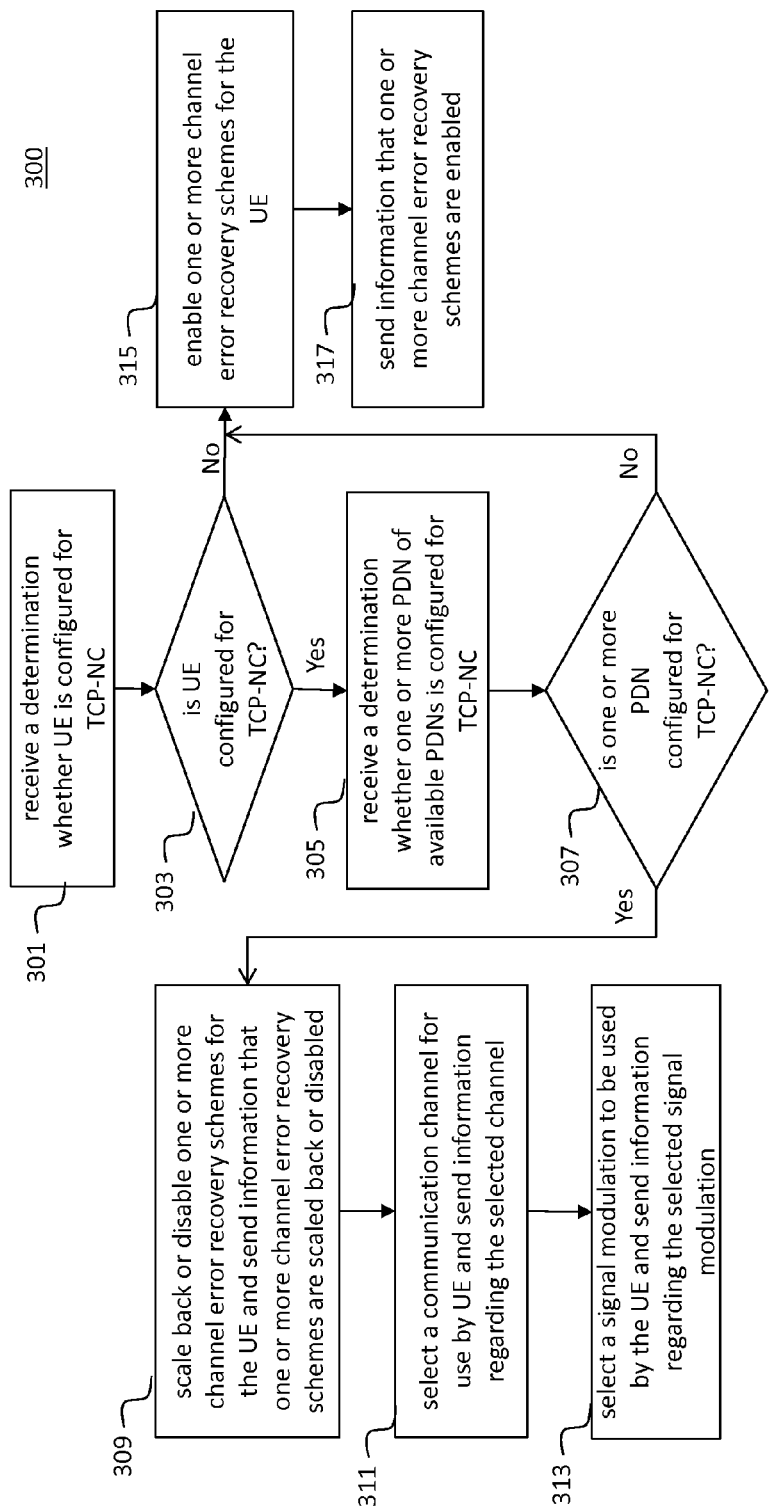
FIG. 3 is another flowchart illustrating a method, in accordance with an embodiment of the present disclosure.

FIG. 3 is a flowchart depicting a method 300, according to an embodiment of the present disclosure. For example, method 300 can be performed by a network (such as the network that includes network device 113) to which UE 101 is connected (or will be connect). It is to be appreciated not all steps may be needed to perform disclosure provided herein. Further, some of the steps may be performed simultaneously, or in a different order than that shown in FIG. 3, as will be understood by those skilled in the art. Reference is made to network device 113 and UE 101 in FIGS. 1A and 1B merely for convenience of discussion. Other systems may be used to perform the method as will be understood by those skilled in the arts.

In step 301, a determination is received whether the UE is configured for TCP-NC. For example, the determination can be made by control logic 105 of UE 101 of FIG. 1A, where a message is sent by UE 101 to network device 113 that includes information regarding this determination. According to another example, the determination can be made at network device 113 by "sniffing" signaling received from, or intended for, UE 101. For example, packet headers can be examined by logic 123 to determine if TCP-NC is being used. It will be understood by those skilled in the arts that the present disclosure can apply to any other methods to determine whether UE 101 can support TCP-NC.

In, step 303, if UE 101 does not support TCP-NC, the method is moved to step 315, where one or more channel error recovery schemes associated with UE 101 are enabled by logic 123, and more specifically channel operating mode module 125. For example, the channel recovery schemes can be physical layer channel recovery schemes as discussed above. In step 317, information regarding the enabled channel error recovery schemes are sent to UE 101 in an information message.

If UE 101 supports TCP-NC, the method is moved to step 305, where a determination is received whether one or more of the PDNs with which UE 101 communicates (or desires to initiate a communication) supports TCP-NC. For example, the UE 101 can signal network device 113 to identify the ones of the plurality of available PDNs that are TCP-NC enabled. This TCP-NC status can be received for each PDN in an information message that also includes the TCP-NC status of the UE (so combined with step 301 above.) Alternatively, the network device 113 may examine packets on individual PDN data flows for indications of TCP-NC capability. For example, packet headers can be examined by logic 123 to determine if TCP-NC is being used, where the packets may be to/from UE 101, or a different UE.

In step 307, if no PDNs support TCP-NC, the method is moved to step 315. Alternatively, if a determination is made that one or more PDNs are TCP-NC capable, one or more channel error recovery schemes are scaled-back, or disabled, for those PDN that are TCP-NC compatible in step 309. For example, channel operating mode module 125 can make this determination and implement on the base-station side. For example, channel recovery scheme ARQ can be disabled, or fewer re-tries can be used. Additionally or alternatively, channel recovery scheme HARQ can be disabled or fewer re-tries can be used. Finally, an information message or signaling can be sent to the UE 101 to define the status of the channel error recovery schemes for each active PDN of the UE.

Additionally or alternatively, in step 311, a communications channel from a plurality of communications channels having different loss characteristics is selected for use by UE 101 based on the TCP-NC status. According to this example, a plurality of communications channels are available for connection between the UE 101 and the network device 113, and these channels have different loss characteristics. Further different channels may be available for the different PDNs used by the UE. In this example, when TCP-NC is, available, the network device 113 via module 125 can select a channel that has a loss characteristic that is higher than it normally would without TCP-NC, because TCP-NC will perform data recovery due to channel loss. If some, but not all, the PDNs available to the UE 101 are TCP-NC capable, then those that are TCP-NC capable would be assigned the more lossy channels, because TCP-NC can be used to correct any errors. Finally, an information message or signaling can be sent to the UE 101 to define the communication channel status for each active PDN of the UE.

Additionally or alternatively, in step 313, signal modulation to be used by UE 101 is selected based on the TCP-NC status of the UE and its corresponding PDNs, and the selection is sent to UE 101. According to this example, a plurality of signal modulations are available for assignment to the UE, each of varying constellation densities (e.g. 16 QAM vs. 64 QAM). In this example, when TCP-NC is available on both UE 101 and a particular PDN, the network device 113 via module 125 can select a signal modulation that has a higher constellation density than it normally would without TCP-NC (e.g. 64 QAM), because TCP-NC will perform any data recovery required due to the higher signal to noise ratio (SNR) requirements. In other words, the selected modulation can have a constellation density that is higher than that of at least one other signal modulation of the plurality of signal modulations. Those PDNs that do not have TCP-NC available are assigned a lower constellation density (e.g. QPSK or 16 QAM), since they do not have the error correction capability of TCP-NC. Network device 113 and/or the network operator associated with network device 113 can send the selected signal modulation to UE 101 using an information message. The information message can be the combined with those in steps 309 and 311, if desired.

The features determined in steps 309-313 can be, collectively referred to herein as "operating modes" of the UE and corresponding PDN. Accordingly, multiple different operating modes associated with the UE 101 communications experience can be modified or adjusted based on the availability of TCP-NC in the UE 101 and its associated PDNs. These include the selection of: physical layer channel error recovery, modulation scheme/constellation density, channel selection, MIMO configuration, and LTE downlink channel selection, among others. Those skilled in the arts will recognize that other operating modes of a communications link can be selected or modified based on TCP-NC status of the UE and its PDNs. Those other modes are within the scope and spirit of the present disclosure.

The present disclosure has been described in terms of LTE wireless communications network. However, the disclosure is not so limited, as will be understood by those skilled in the arts. The present disclosure can apply to any communications network (wireless or otherwise) having a protocol that utilizes different operating modes and can support TCP-NC.

For example, the embodiments of this disclosure can apply to wireless local area networks (LAN) such as WiFi. According to one example, UE 101 can connect to a wireless LAN while UE 101 is disconnected from a cellular network, such as LTE. According to this example, the operating modes of the link between UE 101 and the access point of the wireless LAN can be modified based on a determination that UE 101 and the access point and/or one or more PDNs are configured for TCP-NC. When UE 101 is connected to the wireless LAN, one or more operating modes control the UE's link. In one example, these operating modes can be based on IEEE 802.11 standards. UE 101 and/or the access point of the wireless LAN can determine that UE 101 is TCP-NC capable. UE 101 and/or the access point can also determine that the access point and/or one or more PDNs (to which UE 101 is connected through the wireless LAN) are also TCP-NC capable. In response to these determinations, the one or more operating modes that are used for the UE's link to the access point (and/or link to the one or more PDNs) can be modified (e.g., scaled-back or disable) and the TCP-NC protocol can be enabled for communication, where the TCP-NC can compensate for the modification on the PHY layer operating modes. According to one example, UE 101 and the access point of the wireless LAN can use proprietary signaling methods to determine if UE 101 and/or the access point are configured for TCP-NC.

Additionally or alternatively, UE 101 can communicate over a cellular network (such as LTE) and a wireless LAN (including WiFi) using TCP-NC. Heterogeneous networks (HetNet), which connect different access technologies, can improve capacity and/or coverage. According to one example, UE 101 can communicate to one or more PDNs through the cellular network and the wireless LAN, concurrently. According to this example, UE 101, network device 113, and/or the access point of the wireless LAN can determine whether UE 101 and/or one or more PDNs are configured for TCP-NC. If they are, one or more operating modes of the cellular network and/or the wireless LAN can be modified (depending on, for example, whether UE 101 communicates to TCP-NC capable PDNs through the cellular network, the wireless LAN, or both.)

Figure 4:
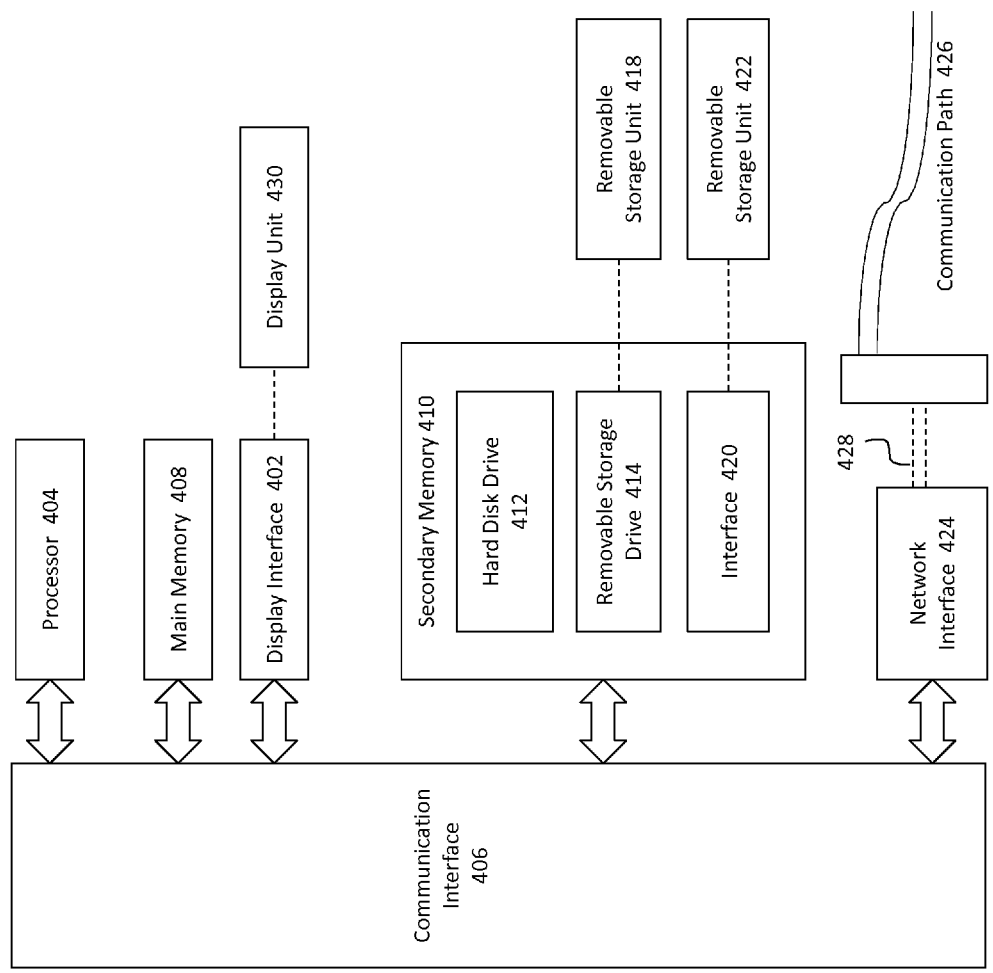
FIG. 4 illustrates a computer system that can be utilized to implement one or more embodiments of the present disclosure.

Various aspects of the present disclosure can be implemented by software, firmware, hardware, or a combination thereof. FIG. 4 illustrates an example computer system 400 in which the present disclosure, or portions thereof, can be implemented as computer-readable code. For example, methods 200 and 300 can be implemented by computer system 400 as the control logic of FIGS. 1A and 1B. Various embodiments of the disclosure are described in terms of this example computer system 400. After reading this description, it will become apparent to a person skilled in the relevant art how to implement the disclosure using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. that is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 that allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications, port, a PCMCIA slot and card, or the like. Software and data transferred via communications interface 424 are in the form of signals that may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in, hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present disclosure as discussed herein. In particular, the computer programs, when executed, enable processor 404 to implement the processes of the present disclosure. Accordingly, such computer programs represent controllers of the computer system 400. Where the disclosure is implemented using software, the software may be stored in a computer program product and loaded into computer system 400 using removable storage drive 414, interface 420, hard drive 412 or communications interface 424.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.).

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with, the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed. It will be apparent to those skilled in the relevant art(s) that various changes in form and detail can be made therein without departing from the spirit and scope of the disclosure. Thus the disclosure should not be limited by any of the above-described exemplary embodiments.

What is claimed is:

1. A method of communicating with a user equipment (UE) in a wireless communications system, comprising:
   determining, by a network device, if the UE is configured for a network coded transmission control protocol (TCP-NC); and
   selecting, by the network device, one or more operating modes for a communications link between the UE and the network device based on whether the UE is configured for TCP-NC,
   wherein the selecting includes scaling back, or disabling, one or more channel error recovery schemes for the communications link when the UE is configured for TCP-NC, wherein the one or more channel error recovery schemes are performed by the UE at a physical layer of a 3rd Generation Partnership Project (3GPP) layer protocol that characterizes the communications link.

2. The method of claim 1, wherein the selecting further includes selecting a communications channel for use by the UE from a plurality of communications channels having different loss characteristics, based on whether the UE is configured for TCP-NC.

3. The method of claim 2, wherein the selected communications channel has a loss characteristic that is higher than that of at least one other channel of the plurality of communications channels, when the UE is configured for TCP-NC.

4. The method of claim 1, wherein the selecting further includes reducing a number of re-tries of one of automatic repeat request (ARQ) or Hybrid automatic repeat request (HARQ).

5. The method of claim 1, wherein the selecting one or more operating modes further includes selecting a number of spatial streams in a multi-input multi-output (MIMO) mode of the UE based on whether the UE is configured for TCP-NC.

6. The method of claim 1, wherein the selecting one or more operating modes further includes selecting a signal modulation to be used by the UE from a plurality of signal modulations based on whether the UE is configured for TCP-NC.

7. The method of claim 6, wherein the selected signal modulation has a higher constellation density than at least one other signal modulation of the plurality of signal modulations when the UE is configured for TCP-NC.

8. The method of claim 1, wherein the UE operates according to a Long Term Evolution (LTE) communications standard that defines the one or more operating modes, and wherein the selecting one or more operating modes further includes selecting a number of downlink carriers for the communications link, based on whether the UE is configured, for TCP-NC.

9. The method of claim 1, further comprising:
sending an information message to the UE, wherein the information message defines a status of the one or more channel error recovery schemes.

10. A user equipment (UE), comprising:
a radio transceiver configured to communicate wireless signals to a base-station; and
a processor configured to:
determine whether the UE can operate according to a network coded transmission control protocol (TCP-NC) so as to determine a TCP-NC status of the UE,
generate an information message for the base-station that reports the TCP-NC status of the UE to the base-station, and
scale back, or disable, one or more channel error recovery schemes for a communications link between the UE and the base-station when the UE is configured for TCP-NC, wherein the one or more channel error recovery schemes are performed by the UE at a physical layer (PHY) of a 3rd Generation Partnership Project (3GPP) layer protocol that characterizes the communications link,
wherein the radio transceiver is configured to transmit the information message to the base-station.

11. The UE of claim 10, wherein the processor is further configured to reduce a number of re-tries of one of automatic repeat request (ARQ) or Hybrid automatic repeat request (HARQ).

12. The UE of claim 10, wherein the processor is further configured to determine a TCP-NC status for each of a plurality of public data networks (PDNs) that are associated with the UE, wherein each PDN provides communications to a corresponding external network that is outside a network associated with the base-station.

13. The UE of claim 12, wherein the processor is further configured to construct the information message to include the TCP-NC status for each of the PDNs associated with the UE.

14. The UE of claim 12, wherein the processor is further configured to disable one or more PHY channel error recovery schemes for channels associated with the PDNs that are compatible with TCP-NC.

15. A base-station equipment, comprising:
a radio transceiver configured to communicate wireless signals to a user equipment (UE); and
a processor configured to:
determine whether the UE is compatible with a network coded transmission control protocol (TCP-NC) so as to determine a TCP-NC, status of the UE;
determine a TCP-NC status for each of a plurality of public data networks (PDNs) that are associated with the UE; and
select one or more channel operating modes for each PDN based on the TCP-NC status of the corresponding PDN and the TCP-NC status of the UE, wherein the one or more operating modes are selected to scale, back, or disable, one or more channel error recovery schemes for a communications link between the UE and the corresponding PDN when the UE and the corresponding PDN are configured for TCP-NC, wherein the one or more channel error recovery schemes are performed by the UE at a physical layer of a 3rd Generation Partnership Project (3GPP) layer protocol that characterizes the communications link.

16. The base-station equipment of claim 15, wherein the one or more channel operating modes includes a signal modulation for each PDN, wherein the processor is further configured to:
assign a first signal modulation to a first PDN that is TCP-NC compatible; and
assign a second signal modulation to a second PDN that is not TCP-NC compatible,
wherein the first signal modulation has a higher constellation density than that of the second signal modulation when the UE is also TCP-NC compatible.

17. The base-station equipment of claim 15, wherein the one or more channel operating modes includes a channel selection for each PDN, wherein the processor is further configured to:
assign a first channel to a first PDN that is TCP-NC compatible; and
assign a second channel to a second PDN that is not TCP-NC compatible,
wherein the first channel has a higher loss characteristic than that of the second channel when the UE is also TCP-NC compatible.

18. The base station equipment of claim 15, wherein the one or more channel operating modes are selected to reduce a number of re-tries of automatic repeat request (ARQ) or Hybrid automatic repeat request (HARQ) between the UE and the corresponding PDN when the UE and the corresponding PDN are configured for TCP-NC.

19. The base station equipment of claim 15, wherein the one or more channel operating modes are selected to determine a number of spatial streams in a multi-input multi-output (MIMO) mode of the UE based on whether the UE and the corresponding PDN are configured for TCP-NC.

20. The base station equipment of claim 15, wherein the UE operates according to a Long Term Evolution (LTE) communications standard that defines the one or more operating modes, and wherein the one or more operating modes are selected to determine a number of downlink carriers for the communications link, based on whether the UE and the corresponding PDN are configured for TCP-NC.

* * * * *